Feb. 7, 1950          O. STERN          2,496,420
APPARATUS FOR DYNAMIC COMPRESSION TESTING
Filed Dec. 18, 1946
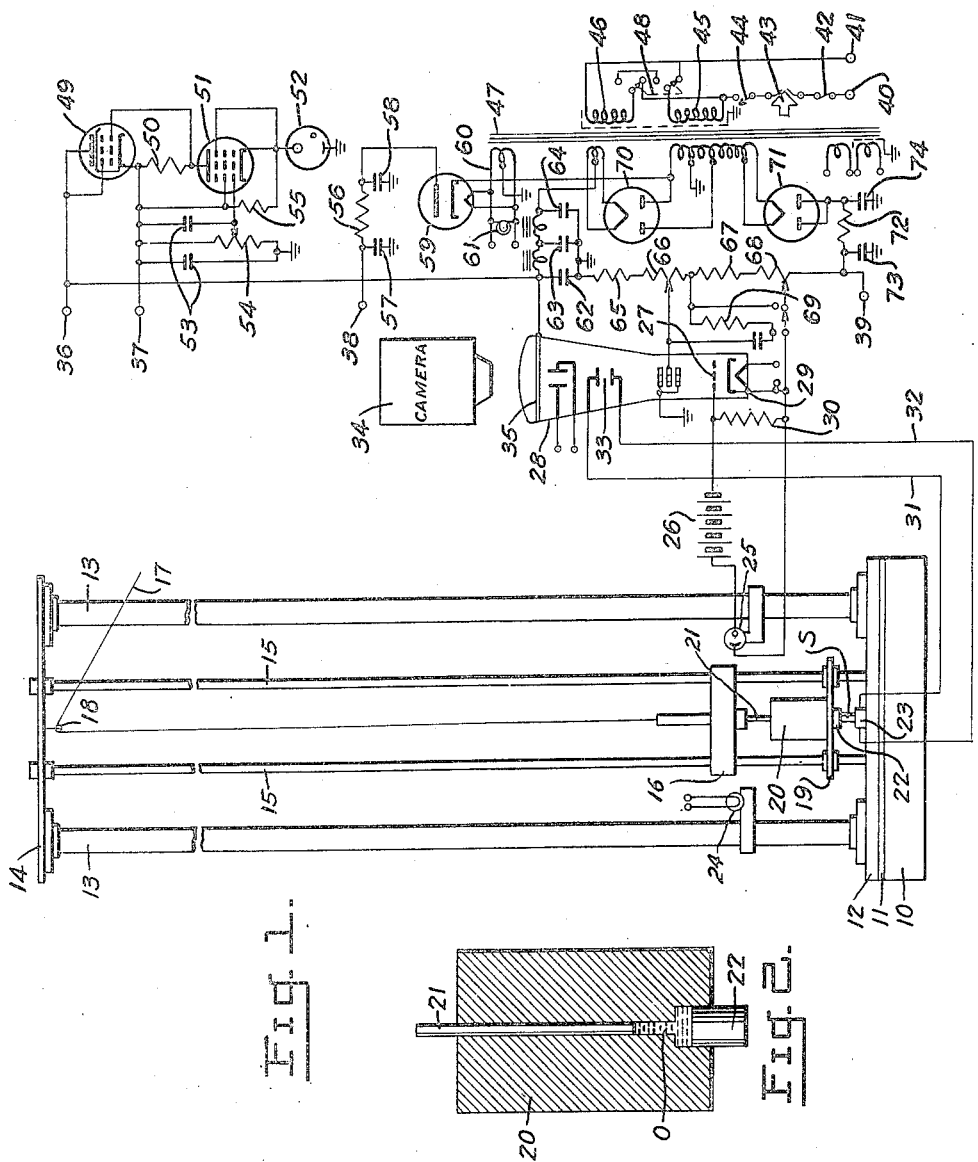
INVENTOR.
OTTO STERN.
BY
ATTORNEYS.

Patented Feb. 7, 1950

2,496,420

UNITED STATES PATENT OFFICE 2,496,420

APPARATUS FOR DYNAMIC COMPRESSION TESTING

Otto Stern, Berkeley, Calif., assignor to the United States of America as represented by the Secretary of War Application December 18, 1946, Serial No. 717,067

2 Claims. (Cl. 73—12)

This invention relates to apparatus for making compression tests of various metals.

It is an object of this invention to provide test apparatus having a hydraulic velocity reducer. Such apparatus makes possible a compression test at low velocity with sufficient available energy, although it uses a small mass as a source of that energy. Moreover, since the energy is furnished by a falling weight of low mass, the impact or force applied to the test specimen can be accurately reproduced for a series of repeated tests.

It is a further object of this invention to provide a test apparatus in which the force applied to the test specimen is indicated on an oscilloscope or is recorded on an oscillograph.

Yet another object of this invention is to provide a compression testing apparatus having a trigger or starting circuit which allows the beam of the cathode ray tube to flow when the weight is dropped, so that the cathode ray tube is made operative although the beam is not normally flowing.

Other and further objects of this invention will readily be apparent to those skilled in the art, or can be learned by a reference to the annexed drawing and specification.

In the accompanying drawings:

Fig. 1 is a diagrammatic and schematic view showing the mechanical parts in front elevation and the electrical parts connected in an electric circuit diagram.

Fig. 2 is a vertical cross section through the hydraulic velocity reducer.

One embodiment of this invention, which has been selected for illustration in the drawings and description in the specification, is as follows.

A heavy steel bottom plate 10 supports a thin layer 11 of one-eighth inch rubber or other resilient material upon which is mounted a steel top plate 12 of one-half inch thickness.

On this base are mounted two pipes 13 of two and one-half inches diameter which support, at their upper ends, a cross piece 14. Steel guides 15 extend between the top plate 12 and the cross piece 14 and are conveniently five-eighths inch in diameter.

A weight 16 of two and three-quarter pounds is slidably mounted on the guides 15 and is lifted by means of a line 17 trained over a pulley 18.

Slidably mounted on guides 15 is a supporting plate 19 which bears upon it a hydraulic velocity reducer. This reducer consists of a cylinder 20 having in it a hollow cavity of two different diameters. In the upper and smaller diametered of these cavities is mounted an elongated piston 21 underlying the weight 16. In the lower and larger diametered of these cavities is a relatively short piston 22. Pistons 21 and 22 have a sliding, relatively oil-tight fit in the cylinder 20. A quantity of heavy oil 0 is located in the cavity in cylinder 20 between the confronting adjacent ends of the pistons 21 and 22. Piston 21 may conveniently be one-quarter inch in diameter, while piston 22 is one inch in diameter. This gives a piston area ratio of 1 to 16 and consequently a reduction in velocity of the force applied to the piston 21 which is transmitted to the piston 22.

Beneath the piston 22 is mounted a specimen S which is to be tested by applying a compressive force to it. Between the specimen S and the top plate 12 is mounted a strain gage 23, conveniently a gage of the piezoelectric type containing a resistance. Other types of force measuring devices may be used if desired.

A trigger circuit is provided to control the cathode ray oscilloscope which forms the indicating mechanism of this device. This trigger circuit comprises a source of light, shown as an ordinary electric light bulb 24, arranged so that its rays fall upon light sensitive cell 25. Cell 25 is a photo-electric cell such as a "Cetron" or "RCA 868 Photo Tube." Cell 25 is connected to a battery 26 which can vary from 4.5 to 62.5 volts. One terminal of battery 26 is connected to the modulating grid 27 of the cathode ray tube 28 (CRT). The other terminal of battery 26 is connected to one element of cell 25, while the other element of cell 25 is connected to the cathode 29 of CRT 28. A resistor 30 of 0.5 megohm (M) is connected in parallel with a series connection comprising battery 26 and cell 25 across modulating grid 27 and cathode 29.

Lead wires 31 and 32 connect the resistance of the strain gage 23 to the vertical or Y axis deflecting plates 33 of CRT 28, CRT 28 being of the electrostatic type. CRT 28, which forms the oscilloscope or indicating part of the test device may also form part of an oscillograph or recording part of the testing device, by the employment of a camera 34 whose lens is focused on the viewing screen 35 of CRT 28. Customarily CRT 28 and camera 34 are enclosed, together with a suitable power supply and other component parts, within a single housing.

A power supply for CRT 28 is indicated as comprising a terminal 36 of +280 volts, a terminal 37 of +155 volts, a terminal 38 of —280 volts and a terminal 39 of —1050 volts. Terminals 40 and 41 supply 115 volts or 230 volts of 40 to 60 cycles, alternating current. Terminals 40 and 41 are connected through a fuze 42, an interlocking switch 43 and a power switch 44 to the primary coils 45 and 46 of a transformer having an iron core 47. Ganged switches 48 serve to connect coils 45 and 46 in series or in parallel across terminals 40 and 41 so as to furnish 115 or 230 volts to the primary of the transformer. Terminal 36 is connected to the plate of a vacuum tube 49, conveniently an "RCA 6V6" or beam power amplifier tube. The cathode of tube 49 is connected through a resistor 50 of 500 kilohms (K) to the plate of a vacuum tube 51, conveniently an "RCA 6SJ7" or triple-grid detector amplifier tube. The cathode of tube 51 is connected to vacuum tube 52 which is a one-quarter watt neon tube. Condensers 53 are one microfarad (mfd.) each. Resistor 54 is 1 M while resistor 55 is 150 K. Terminal 38 is connected through resistor 56 of 50 K across condenser 57 of 16 mfd. and condenser 58 of 0.5 mfd. to the plate of diode 59 whose cathode is heated by secondary coil 60 forming part of the transformer which has a pilot light 61 of 6.3 v. across it. The condenser 62 is 40 mfd., condenser 63 is of 16 mfd. and condenser 64 is 0.5 mfd. Resistor 65 is 1 M, resistor 66 is 500 K, resistor 67 is 200 K, resistor 68 is 100 K, and resistor 69 is 1 M. Vacuum tubes 70 and 71 are a pair of "RCA 80" full wave, high vacuum, rectifying tubes. Resistor 72 is 50 K and condensers 73 and 74 are both 0.5 mfd.

The mode of operation of the testing device described above is as follows. The specimen or test piece S, which is to undergo a compression test, is placed in series alignment with the strain gage 23 between the lower, larger piston 22 and the top plate 12. The switches 43 and 44 are closed so that the power is applied to CRT 28, which is allowed a sufficient period of time for the current to assume a steady state condition, in order that the oscilloscope be ready to operate.

A suitable weight 16 having been selected and placed upon guides 15 and connected to line 17, the weight 16 is lifted to a desired height by means of the line 17. The line 17 is then released so that weight 16 falls, guided by guides 15, and strikes the upper smaller piston 21 with a definite, known force or impact. This force or impact is transmitted through the layer of heavy oil 0 to the lower larger piston 22, which in turn transmits the force to the test specimen S and the strain gage 23. The shock or concussion of this force is absorbed by the resilient layer 11.

The falling weight 16, at the moment of its impact with piston 21, passes between the source of light 24 and the light cell 25. In so doing the weight cuts off the beam of light falling on the cell 25 and removes the potential difference previously across resistance 30. This causes the modulating grid 27 to allow the beam of CRT 28 to flow and thus places the oscilloscope in condition to give an indication which can be viewed or recorded.

The force passing through the strain gage 23 causes a variation of its resistance which is transmitted as an electric impulse through the wires 31 and 32 to the vertical or Y axis deflecting plates 33 of CRT 28. This impulse applied to the deflecting plates 33 causes a corresponding deflection of the beam passing through CRT 28 from cathode 29 to anode or viewing screen 35. Since screen 35 is of luminous material this causes an indication or displacement of the rays of the beam. This displacement is visible to an observer of the screen 35 of CRT 28. If it is desired to record the indication of the oscilloscope, a camera 34 is operated to photograph the indication appearing on the viewing screen 35. A sweep or time base circuit may be applied to the horizontal or X axis deflecting plates of CRT 28. In such case compression or load versus time curve may be seen or recorded on screen 35. It is also possible to connect CRT so as to take load versus set curves.

I claim:

1. A machine for testing specimens under compression dynamically, including, a weight in which power is stored by lifting and from which power for making the test is released by dropping and intercepting the fall of the weight, a cylinder having in it a hollow chamber for liquid, a small-diameter piston slidably mounted in said cylinder and having one end arranged to intercept the fall of said weight and its other end located in contact with the liquid in said chamber, a large-diameter piston slidably mounted in said cylinder and having one end in contact with the liquid in said chamber and out of contact with said small-diameter piston and its other end protruding from said cylinder for travel at a slower speed than said small-diameter piston, a gage toward and away from which said large-diameter piston is movable and a support toward and away from which said large-diameter piston is movable so that, when a specimen is mounted in the path of travel of said large-diameter piston and is carried by said gage and said support, said weight furnishes power which passes through said pistons and the liquid between them and compresses said specimen and causes a corresponding indication on said gage.

2. A machine for compressing specimens to test them, including, a weight slidably mounted for falling movement to supply the force for the compression, a hollow cylinder slidably mounting separated pistons of different diameters whose outer ends project from said cylinder and whose inner ends are separated by a quantity of heavy oil in said cylinder, the smaller-diametered of said pistons being located beneath said weight to receive the force of the fall thereof, a support, a gage interposed, together with the specimen to be tested, between said support and the larger-diametered of said pistons, and a resilient stop on which said support is mounted so that the force of the fall of said weight is transmitted at reduced speed by the larger-diametered of said pistons to said gage and said specimen in series, whereby the amount of said force is indicated by said gage, and the force is finally absorbed by said stop.

OTTO STERN.

REFERENCES CITED

The following references are of record in the file of this patent:

UNITED STATES PATENTS

| Number | Name | Date |
|---|---|---|
| 1,909,703 | Moore et al. | May 16, 1933 |
| 1,921,624 | Lewis | Aug. 8, 1933 |
| 2,178,471 | De Bruin | Oct. 31, 1939 |
| 2,197,585 | Lundquist et al. | Aug. 16, 1940 |
| 2,362,589 | Simmons, Jr. | Nov. 14, 1944 |
| 2,382,673 | Sihvonen et al. | Aug. 14, 1945 |

FOREIGN PATENTS

| Number | Country | Date |
|---|---|---|
| 279,919 | Germany | Nov. 3, 1914 |
| 491,740 | France | Feb. 14, 1919 |